United States Patent [19]

Maki, Jr.

[11] Patent Number: 5,044,462
[45] Date of Patent: Sep. 3, 1991

[54] FOCUSED PLANAR TRANSDUCER

[75] Inventor: Voldi E. Maki, Jr., Austin, Tex.

[73] Assignee: Halliburton Logging Services, Inc., Houston, Tex.

[21] Appl. No.: 560,676

[22] Filed: Jul. 31, 1990

[51] Int. Cl.$^5$ .......................... G01V 1/40; H04N 5/30
[52] U.S. Cl. .................... 181/103; 181/106; 367/123; 367/912; 73/628
[58] Field of Search ............... 367/105, 122, 123, 152, 367/912; 33/303; 73/152, 628, 629; 181/103–106

[56] References Cited

U.S. PATENT DOCUMENTS

| | | | |
|---|---|---|---|
| 3,086,195 | 4/1963 | Halliday | 367/105 |
| 3,693,415 | 9/1972 | Whittington | 73/152 |
| 4,012,952 | 3/1977 | Dory | 73/152 |
| 4,241,611 | 12/1980 | Specht et al. | 367/105 |
| 4,276,779 | 7/1981 | Davis | 73/628 |
| 4,455,630 | 6/1984 | Loonen | 367/105 |
| 4,532,615 | 7/1985 | Ballinger | 367/105 |
| 4,661,938 | 4/1987 | Jones et al. | 367/123 |
| 4,691,307 | 9/1987 | Rambow | 367/69 |
| 4,780,857 | 10/1988 | Lyle et al. | 367/35 |
| 4,855,965 | 8/1989 | Rambow | 367/28 |

FOREIGN PATENT DOCUMENTS 2168569 6/1986 United Kingdom .

Primary Examiner—Nelson Moskowitz
Attorney, Agent, or Firm—William J. Beard

[57] ABSTRACT

An acoustin transducer system for a borehole televiewing apparatus is set forth. In the preferred embodiment, a ceramic circular disc is used and is divided by grooves selected thereon into a set of N concentric rings where N is a whole number integer. Each ring has its own associated transmitter and they are fired in a controlled sequence. Each ring operates as a receiver, and they form output signals which are amplified and controlled delay at the respective delay lines, the several output signals are summed. This assures that the illuminated regions of the borehole is in focus and has a greater depth of field. And a method is also described whereby multiple simultaneous electronically formed acoustic beams are utilized in a differential mode to achieve high spatial resolution in time of flight measurements.

17 Claims, 4 Drawing Sheets

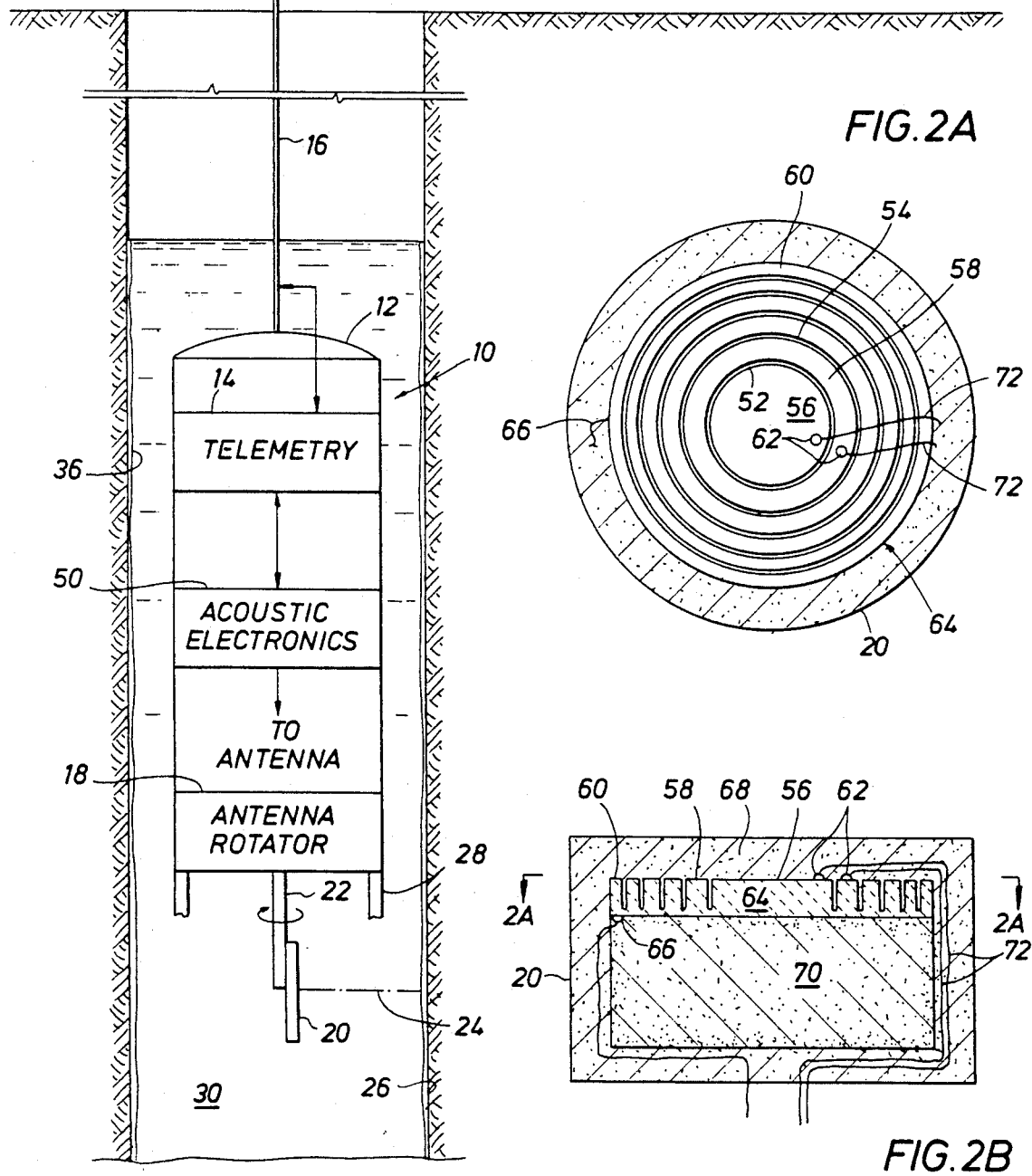

FIG. 3A
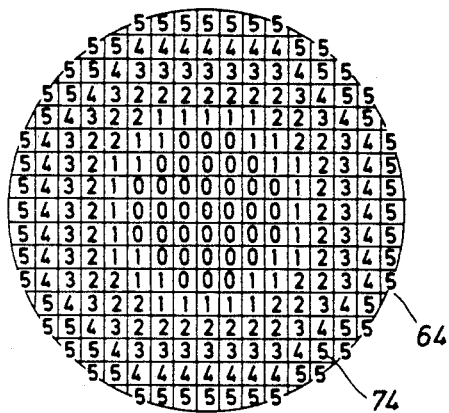
FIG. 3B
FIG. 3C
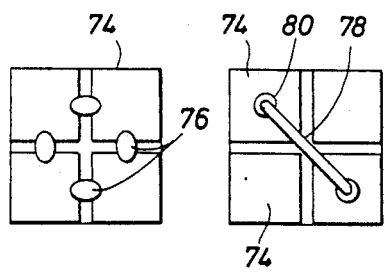
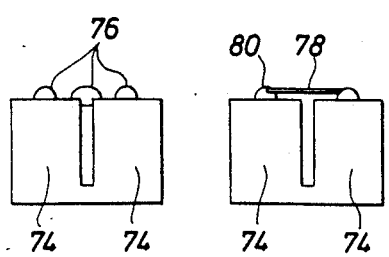
FIG. 4
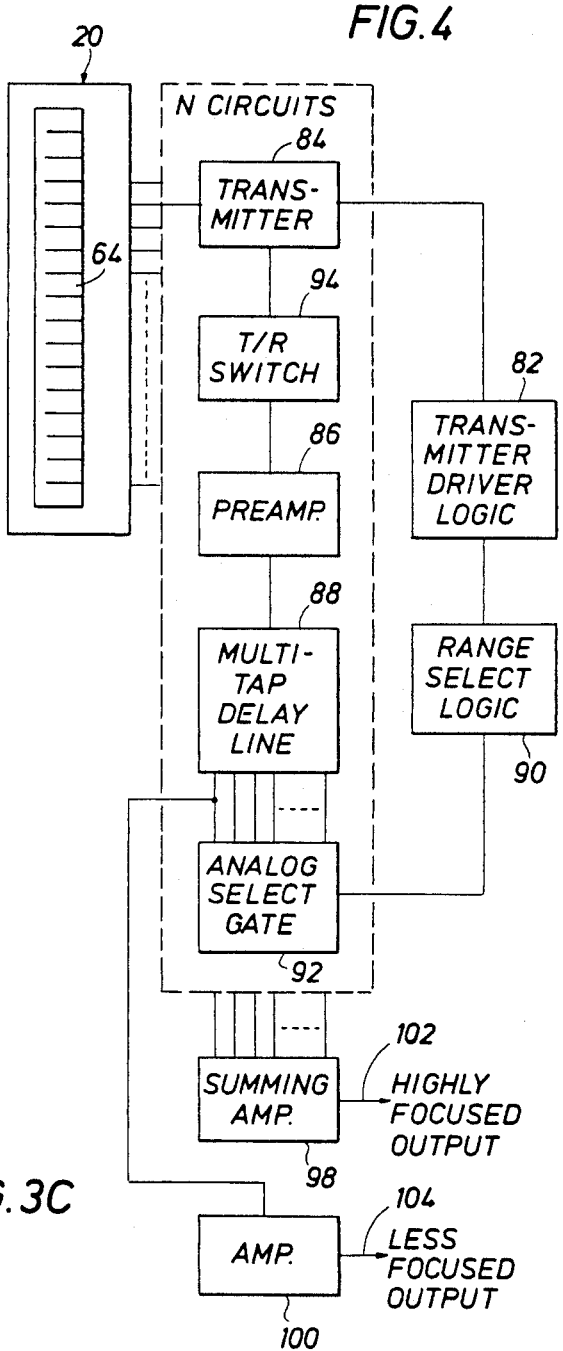

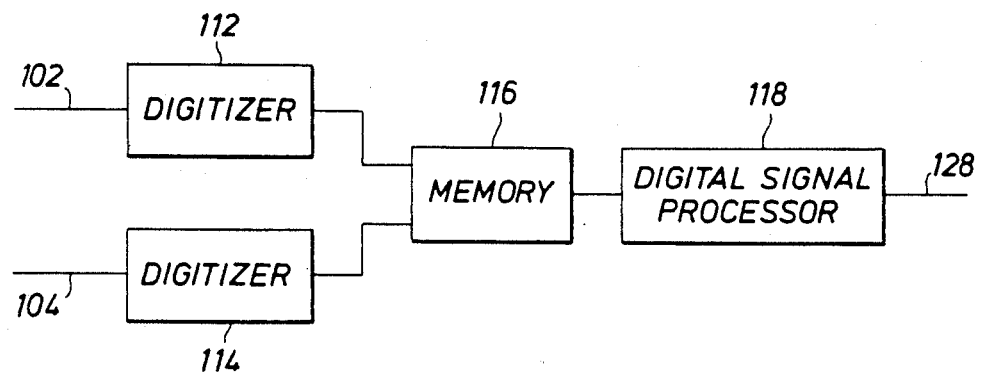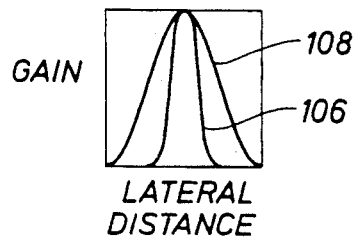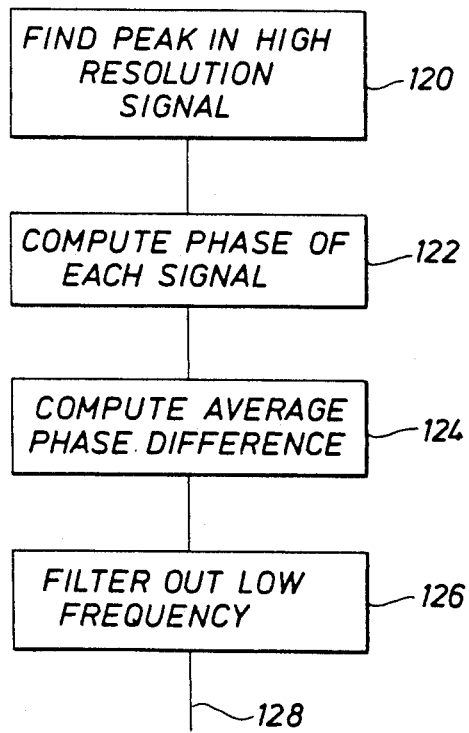
FIG. 5

FOCUSED PLANAR TRANSDUCER

BACKGROUND OF THE DISCLOSURE

This disclosure is directed to a borehole television system for use in well boreholes. The BHTV provides an output signal which is indicative of the nature of the borehole. Useful information can be obtained from this. While the term BHTV is used, it does not ordinarily refer to a system which operates where the surface is illuminated with light and surface reflections are then observed. Rather, the surface is illuminated with acoustic pulses and the acoustic pulse return signal is used in some fashion to obtain indication of the surface of the surrounding borehole. This procedure is normally carried out in an open hole condition where the well is filled with drilling fluid (mud is the usual term). The wall is intended to be at a controlled and specific distance from the antenna which transmits and then receives the acoustic pulse. For optimum resolution, the acoustic energy is focused at some specific distance from the logging tool. Sensitivity for the instrument is optimum if the borehole wall is at the focused range from the instrument. This assumes, of course, that the sonde which supports the instrument is centralized in the hole so that the rotated antenna array is rotating along the centerline axis of the borehole. This also assumes that the hole is circular and that surface irregularities are minimal. These are very nice assumptions which do not always hold true. Rather, there are many instances where the focal distance of the transducer does not match the distance of the sidewall. This event can arise for a multitude of reasons, and it is sufficient to note that perfect focusing simply is not possible with a fixed focus transducer. The wall may be irregular, the hole may be non-circular, or the surface irregularities may be quite large. In addition, the sonde may not be centered in the borehole. For these and other reasons, it is difficult if not impossible to make a BHTV image which conveys all the data and information which is desired when the range to the borehole wall varies considerably. The output which results from an out of focus system cannot be improved if the transmitted pulse was out of focus, so to speak, resulting in a loss of resolution. Accordingly, the BHTV image is not sharply resolved.

The present disclosure sets forth a focused planar transducer providing improved depth of field. This depth of field is accompanied by an increased return signal amplitude. These two improvements enable a sharper image to be obtained from a BHTV system so that surface roughness and other important factors regarding the formations penetrated by the borehole can be understood. With higher resolution, intersected boundaries along the borehole can be observed more readily. The present apparatus thus serves as an improved acoustic BHTV system, markedly improved over that which is set forth in representative U.S. Pat. No. 4,780,857 or that suggested by UK Patent 2,168,569A which first suggests focusing the transducer element to increase resolution and increase the available signal amplitude. The increase in aperture of the transducer also reduces the effect of elliptical holes and decentralization of the tool in the borehole. The new transducer design also allows for more advance signal analysis techniques to be applied. Since the focusing is done electronically, multiple simultaneous focused beams may be formed. By analyzing more than one resolution at a time, a technique similar to differential phase contrast microscopy may be applied to substantially increase the resolution of the travel time measurement. References to this topic may be found in *IEEE Transactions on Sonics and Ultrasonics*, Vol. SU-29, No. 6, November 1982, p. 321 and entitled *Dichromatic Differential Phase Contrast Microscopy*. The present system is thus operative at typical acoustic pulse frequencies in the range of about 100 to about 500 kilohertz wherein an acoustic pulse is transmitted normal to the borehole wall. The present apparatus provides more accurate representation of the surface features. Accordingly, the nature or character of the surface can be known more readily.

The present apparatus is briefly summarized as incorporating a circular planar member having multiple grooves cut therein where the grooves are circular and spaced about a common axis. Each ring is connected to its own transmitter and receiver system. Each ring defined by the grooves serves as a transmitter and receiver in its own right. The transmitters are controlled with digital logic such that each one produces a pulse at the appropriate time to cause the acoustic energy to be focused at the desired distance from the transducer. In the receive mode, the signal from each element is supplied to a preamplifier and then to a multi-tap delay line. Since there are N rings (where N is a whole number integer), there are preferably $N-1$ delay lines and they are selectively tapped so that the outputs of the several delay lines are summed at a summing amplifier to provide an output. The several summed signals provide the received signal focused at the same range as the transmitted signal. Alternately, the transducer may also be dynamically focused by selecting appropriate taps of the delay lines as a function of time. Doing this will cause the focus for the receive signal to be correct for any received signal. By choosing fewer than all of the elements as the receiver, the apparent aperture and therefore the degree of focusing may be changed. Indeed many degrees of focusing are available simultaneously during a measurement cycle. To implement the phase contrast imaging process, the phase difference between a highly focused signal and a less focused signal are compared. The phase difference is an indication of difference in distance between the highly focused signal image and the less focused image. Hence the term phase contrast imaging.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a sectional view through an acoustic measuring tool in accordance with the teachings of the present disclosure suspended in a well borehole and which incorporates a rotatable transducer antenna for sending and receiving acoustic pulses against the sidewall of the borehole;

FIGS. 2A and 2B are enlarged views of the acoustic transmitter element having several grooves cut therein to define concentric rings for transmitting purposes;

FIGS. 3A and 3B are an altenate form of an acoustic transmitter element utilizing square cuts in the ceramic member showing the square elements connected in the manner shown in FIG. 3C to closely approximate the rings of the transmitter element of FIG. 2;

FIG. 4 is an electronic schematic block diagram showing the components of the transducer system and selected waveforms;

FIG. 5 is a block diagram showing the implementation of the phase contrast imaging process using digitized data and also shows a gain curve and a processing flow chart;

DETAILED DESCRIPTION OF THE PREFERRED EMBODIMENT

Figure 6:
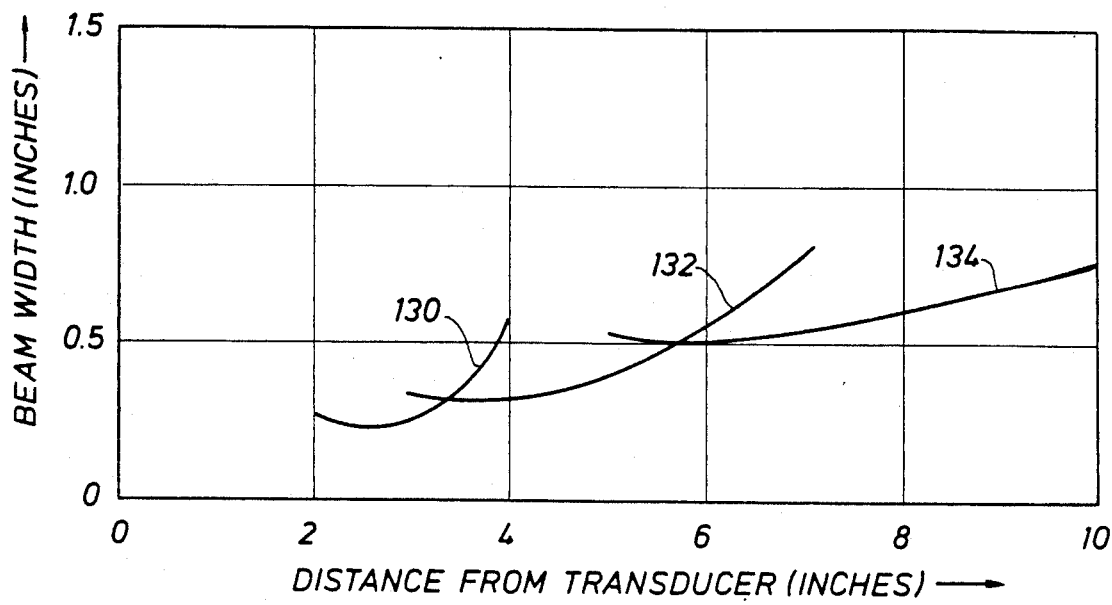
FIG. 6 is a graph showing beam widths as a function of range and chosen focusing distance.

Attention is directed now to FIG. 1 of the drawings where the numeral 10 identifies an acoustic measuring device supported in a sonde 12 in accordance with the teachings of the present disclosure. The sonde encloses a telemetry system 14 which provides an output signal on a logging cable 16 which extends to the surface. The sonde includes an antenna rotator 18 for rotating an antenna or transducer 20 in accordance with the present disclosure. It will be described in greater detail hereinafter. The antenna is mounted on a rotatable mechanism 22 so that the emitted acoustic pulse travels radially outwardly along a propagation line 24 and impinges on the sidewall 26 of the borehole. The sonde 12 is constructed with a housing 28 which is elongate and cylindrical. The antenna 20 is preferably submerged in the borehole fluid 30 to provide better acoustic coupling and reduced beam divergence than that offered by enclosing the transducer in an oil bath and utilizing a window for the acoustic energy to pass through.

As will be understood, the well borehole 26 has been represented as a relatively smooth surface. In fact, it is not and it can be irregular depending on the nature of the drilling process and the nature of the formations penetrated by the borehole 26.

The conductor 16 extends to the surface where it passes over a sheave 38. The sheave 38 directs the logging cable 16 to a drum 40 where it is spooled for storage. The conductors in the cable 16 are connected with surface located electronics 42. The output data is displayed on a display 44. The data is recorded electronically 48, simultaneously with depth and time. The time is obtained from a real time clock 52 with millisecond resolution. The depth is provided by an electrical or mechanical depth measuring apparatus 46 which is connected with the sheave 38 and which also connects to the recorder 48. The present apparatus further includes acoustic electronics 50 which are supported in the sonde. The acoustic logging device 10 will be understood on explanation of the various components discussed below.

The antenna 20 is better identified in FIGS. 2A and 2B of the drawings where it is shown to be a circular piezoelectric disk member 64. It is poled in the thickness mode, typically having both flat surfaces coated with a conducting metal electrode. It has a solid backing 70 which acts as a highly attenuative medium absorbing the acoustic energy which is radiated into it. The ceramic and backing are housed in an epoxy material 68 having a thickness separating the ceramic from the borehole fluid by a quarter wavelength. This material 68, having a proper acoustic impedance, is a well known technique for improving the transfer of acoustic energy from the ceramic which has a high impedance to the water (mud) which has a lower impedance. The ceramic is cut with a plurality of circular grooves at 52 and 54. These grooves typically do not fully penetrate the ceramic device for ease of manufacturing. Rather, they define ring shaped surface areas and provide acoustic as well as electrical isolation between the individual elements. Inside the smallest ring shaped surface 58 is the center disk 56. This pattern continues to the outer ring shaped area 60. Electrical attachments are made to the ceramic using solder or conductive epoxy. The ground electrode 66 is attached before the ceramic is bonded to the backing material. Each of the rings is attached at 62 to conductors 72 using either solder or conductive epoxy. The wires, now attached to the various rings, and a single ground electrode are preferably led to the back of the transducer, being held in place by the surrounding epoxy housing 68. The total number of ring shaped areas is N where N is a whole number integer. Moreover, N is typically in the range of about three at the low end, and increases up to about ten. In theory, N can increase further, but there is a practical limit in the benefit obtained by increasing N. The optimum number for N is about five to eight. In this particular embodiment, the rings are not evenly spaced radially but are spaced based upon a more subtle criterion. They are spaced such that when focused at the minimum range, the difference in time delay required for each ring is a fixed value. This procedure simplifies the electronics components somewhat. The delay differences for all of the ranges may be kept the same simplifying the electronic design. Even if respective delays are slightly imperfect, there is little degradation in the resulting focusing. There are obviously other methodologies which may be used to select the spacings of the rings. Modeled responses of transducers indicate that the maximum time delay from one ring to the next when forming a focus is related to the frequency such that the time delay should be less than or equal to 90 degrees.

FIGS. 3A and 3B show an alternate method for defining the ring shaped pattern on the ceramic element 64. The ceramic 64 is cut into square elements 74. The individual elements are then connected to form a set of interconnected areas simulating a ring shaped area. One example is as shown where the elements all labeled 0 are connected together. Likewise, all elements labeled 1 are connected, and so on, through the elements labeled 5. This method of construction has several advantages over the simple ring configuration. The straight lines are easier to cut using standard production tools. In the previous design, each of the rings has a slightly different resonant frequency because their geometries are each slightly different. The differences in frequency, slightly reduce the imaging resolution of the transducer. The cuts are again 90 percent of the way through the solid ceramic body and are preferably 0.6 times the thickness of the ceramic in spacing. The electrodes of the individual square elements 74 are connected in FIG. 3C using small beads of silver epoxy, 76 to connect the correct pattern of square surfaces. Where a diagonal connection is required, a wire 78 is placed across the diagonal and silver epoxy 80 is used to bond it to the square element 74 and hold it above any elements which it crosses without connection. The wires to the electronics are attached as shown in FIG. 2. The resonant frequency of each square element is the same but slightly lower than the basic thickness resonance of the disk. The result is that each ring formed by the set of squares has the same resonant frequency and mechanical Q. Each of the rings therefore behaves almost identically in their source and receiver characteristics.

Each of the rings 56, 58 and 60 shown in FIG. 2A ranging from the smallest on the inside to the largest on the exterior is used as a separate transmitting transducer. They are connected to their own dedicated transmitter and receiver units. This is better shown on review of FIG. 4 of the drawing where the electronics is shown. First of all, the electronics in FIG. 4 includes N duplicate circuits. Thus, if there are six rings in the acoustic transducer assembly, then six duplicate circuits are provided. The description set forth hereinbelow can therefore be extended to all of the N circuits. The acoustic electronics 50 incorporates range select logic 90 which determines the focal distance of the transducer, both for the transmit mode and the receive mode. The transmit focus may be controlled independently from the receive focus. The transmit focal distance is sent to the timing driver logic 82 which controls the N signals going to each of the N transmitter circuits 84. In its simplest format the transmit pulse is delayed by the decrease in travel time required for the acoustic energy to propagate from each ring to the desired focal depth as the ring diameter decreases. The outer ring typically has no delay, and the inner disk has the most delay. The signal out of the transmitter circuit 84 may be either a single pulse or a burst (typically a square wave) signal at the resonant frequency of the transducer. The N transmit-receive switches 94 are used to protect the N preamp circuits from the high voltage transmit pulse on the ceramic. The preamps 86 have typically 20 dB of gain to get the signal level up to a suitable level and have a lower output impedance than the ceramic, allowing them to drive the delay lines 88. The N multiple tap delay lines are used to compensate for the travel time differences of the signal at some focal distance propagating to each ring of the transducer. Again the signal from the center disk will typically be delayed the most since it will be the closest to the focus, and the outer ring signal will be delayed the least since it is the farthest from the focus. As the focal distance increases, the total range of delays decreases. The outputs of the taps of the delay line go into N sets of analog select gates 92. Although an arbitrarily large number of taps may be used, a number of from 3 to 10 is sufficient. This gives from 3 to 10 discrete focal distances for the transducer. The tap selection and thusly the receiver focal distance is controlled by the range select logic 90. The delay taps are thus selected such that the N signals coming from a chosen focal distance all appear at the outputs of the N analog select gates simultaneously. The N signals are summed in the summing amplifier 98 to produce the focused signal output 102. A second output 104 is also made available which is the signal from only the center element. The peak of the envelope of the signal 102 forms the amplitude signal. The time location of the onset of this signal is used to derive the travel time, indicating the range to the borehole wall. This forms the typical output signal provided to the surface through the telemetry so that the BHTV system presents an image of what is seen by the equipment in the borehole. The signal processing this signal 102 has been described in previous works.

The phase contrast imaging utilizes the signals 102 and 104. While the signal 102 represents the highly resolved beam and the signal 104 represents a less resolved beam, FIG. 5 shows one implementation of the phase contrast imaging process. The gain graph shows the spatial resolution of the two signals 102 and 104, where the curve 106 is the resolution of 102 and the curve 108 is the resolution of 104. In this processing method, both signals are digitized at about 20 times the resonant frequency of the transducer by the digitizers 112 and 114 and the data are stored in the memory 116. The two signals are then processed by a digital signal processor 118 to find the differences in arrival times. The signal processing sequence begins at the step 120 where the location of the peak of the high resolution signal is found. The phase of both signals is then computed in the step 122, beginning in time where the envelope of the signal becomes greater than one-half the peak value until it drops in amplitude to below one-half the peak. The average phase difference over the measurement period is then computed in the step 124. These measurements may be filtered to pass high frequency content in the step 126 over the period of one revolution to remove the effects of the changes in the travel time to the borehole wall because of elipticity or eccentering of the tool. The phase contrast data 128 may now be sent up hole and displayed as a gray scale image in place of the usual travel time image.

The BHTV presentation is typically presented as a function of depth in the well and as azimuth. For instance, a particular image might be obtained wherein the depth is 8,000 feet, and the image is positioned so that it is centered on an acoustic propagation line which has an azimuth of zero degrees or north. Benefits of the present system can be obtained on review of the graphs. FIG. 6 shows the 3 dB beam widths for three focal distances of a 2.5 inch diameter transducer operating at 280 kHz. When the transducer is focused at 2.4 inches, the three dB beam width is 0.22 inches according to the curve 130. As the distance to the target changes, the beam width increases significantly, as would the case be for a fixed focusing transducer. If for instance the range increases to 4 inches, the fixed focus transducer would have a beam width of 0.55 inches. The electronically focused transducer could be refocused and produce a beam-width of 0.31 inches, see the curve 132. From this, it may be seen that the depth of field is relatively small when the transducer is focused at a short distance. This would indicate that a single fixed focus transducer would only work well when the distance to the borehole wall was close to the focal distance of the transducer. With the electronically focused transducer, the focal distance can be changed to match the variations in the range to the sidewall with what ever precision is deemed suitable. It may be seen that, as the range increases to 6 inches, the focusing does not need to be changed by a distance shown in the curve 134, or about 10 inches as illustrated.

Figure 7:
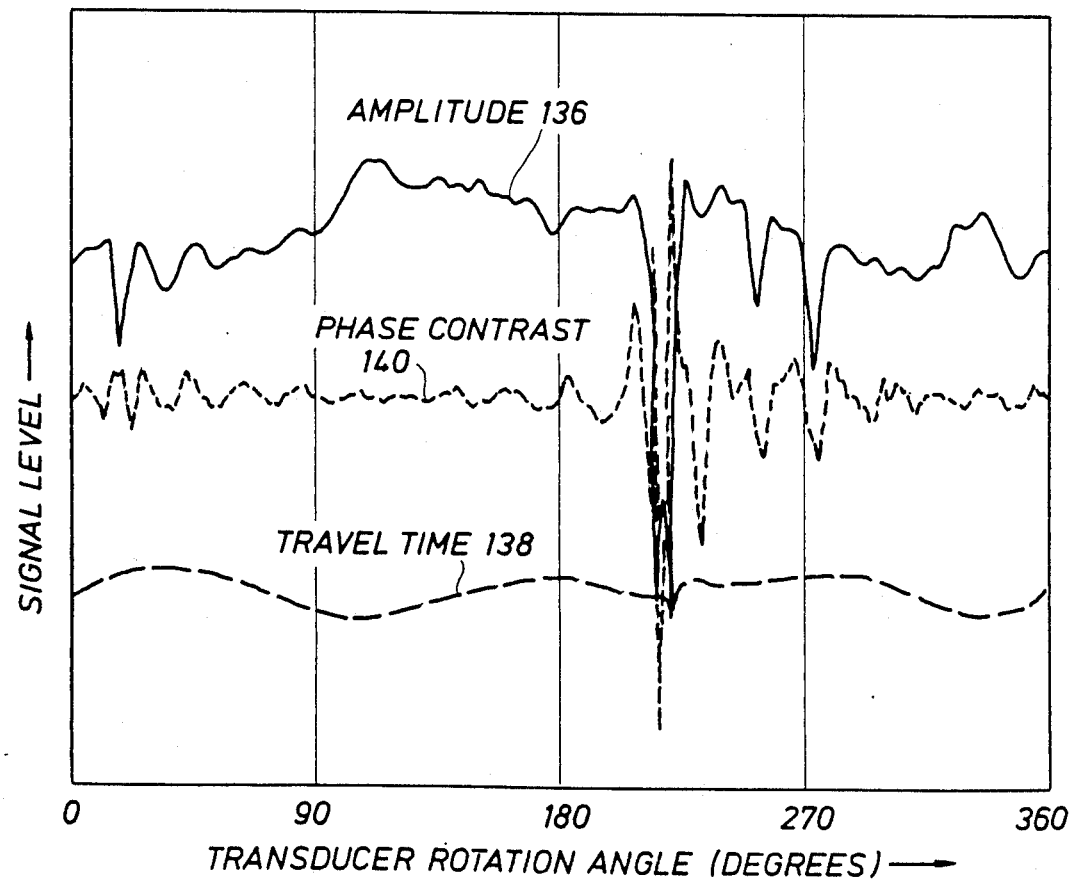
FIG. 7 is a graph showing a comparison between amplitude, travel time, and phase contrast processing of data.

Several processed signals are shown in FIG. 7. The amplitude 136 of the echo from a simulated formation shows many small features. Several decreases in the signal amplitude are shown which are from irregularities in the surface. The travel time data 138 shows some of this information. Several of the events shown on the amplitude data are not visible in the travel time data.

The travel time image is not as well resolved as the amplitude image. The phase contrast image data 140 shows as much information as the amplitude data 136. In the past, little correlation could be made between travel time and amplitude data because of the differences in resolution. Since they now have the same resolution, good correlations can be made. Each event in the amplitude data may now be correlated with the phase contrast data so that changes in acoustic impedance may be separated from changes in the surface character.

The BHTV of the present disclosure is able to provide better and more detailed observation of events occurring in the borehole in that it presents surface detail data not otherwise obtainable heretofore. This enhanced sensitivity enables the device to present data with improved resolution and sensitivity. Moreover, the depth of field is enhanced. Further, the sensitivity of the system to variations in range is reduced, thereby enabling the device to operate over a wider dynamic range so that the greater irregularities in the borehole 26 can be observed. Dynamic focusing correction is markedly improved over the fixed focus system exemplified in UK patent 2,168,569A. The surface character measurement has also been enhanced.

While the foregoing is directed to the preferred embodiment of the present invention, the scope thereof is determined by the claims which follow.

What is claimed is:

1. An acoustic borehole imaging system comprising:
   (a) an acoustic piezoelectric transmitter and receiver transducer, said transducer being generally circularly disk shaped and having a thickness T, and being arranged to oscillate in a thickness mode when electrically excited by a potential difference applied across said thickness, and having N independent concentric circumferential regions therein wheren N is an integer;
   (b) N acoustic transmitter circuits each of which is connected to one of said N concentric circumferential regions wherein said N acoustic transmitter circuits are operated in a timed sequence to produce potential differences across said thickness T so that said circumferential regions have timing dynamically variable according to a control function;
   (c) N acoustic receiver circuits connected to said N circumferential regions where N is an integer, said N circumferential regions are each connected to one of N variable duration delay lines with selectable outputs and whose selection is determined by a control means utilizing digital logic; and
   (d) summing means to sum outputs of said N multiple tap delay lines and produce an acoustic pulse output.

2. The apparatus of claim 1 wherein said summing means is provided with output from each of said N circumferential regions to produce the output thereof.

3. The apparatus of claim 1 wherein said summing means is provided with outputs from fewer than each of said N circumferential regions to produce the output thereof.

4. The apparatus of claim 1 wherein said acoustic transceiver transducer is divided into concentric circular regions and said N acoustic transmitter circuits are connected respectively to said N concentric circumferential regions, and further wherein said N acoustic transmitter circuits are operated in timed sequence said sequence being selected by control circuitry utilizing digital logic.

5. The apparatus of claim 4 wherein said N acoustic regions are concentric rings.

6. The apparatus of claim 5 wherein said N acoustic transmitter circuits are individually connected to individual rings, and wherein said N concentric circumferential regions are coplanar.

7. The apparatus of claim 6 wherein N preamplifiers are each connected individually to N acoustic transducer regions.

8. The apparatus of claim 7 wherein said N preamplifiers each connect individually with said N delay lines, and the output of said delay lines collectively are summed at an output means, and wherein the delay of the respective delay lines is controlled by said controller to thereby obtain a desired focal distance in response to acoustic pulses transmitted thereby.

9. The apparatus of claim 8 wherein each of said delay lines have multiple output taps and the taps for output from a particular one of said N delay lines are selected by a circuit means to sum the N delayed signals from said delay lines.

10. The apparatus of claim 9 wherein said transmitter circuits form a common output pulse having a frequency of less than about 500 kilohertz.

11. The apparatus of claim 1 wherein said transmitter circuits are commonly pulsed at a common frequency.

12. The apparatus of claim 1 wherein said concentric circumferential regions are approximated by multiple small squares connected to each other to approximate concentric rings.

13. A method of transmitting an acoustic pulse in a well borehole comprising the steps of:
   (a) at an acoustic transceiving piezoelectric transducer, defining N multiple concentric circumferential coplanar regions where N is an integer, and wherein said N regions are directed along a common radial line of acoustic propagation normal to the plane of said circumferential regions and coincident with the center thereof, and toward the wall of a borehole surrounding said acoustic transducer;
   (b) applying plural transmitter pulses to said N regions wherein each of said N regions is provided with its own pulse in a timed sequence controlled by a control circuit employing digital logic and according to a control function which may vary dynamically as a function of time and which is a function of a receiving signal, thereby transmitting multiple acoustic pulses toward the sidewall of the borehole in a dynamically controlled timed sequence;
   (c) receiving a return acoustic reflection from the transmitted acoustic pulses wherein said acoustic reflections impinge on each of said N circumferential regions;
   (d) from each of said N circumferential regions, obtaining N output signals wherein said output signals are collectively input to an output circuit means; and
   (e) selectively and controllably by different measures delaying each of said N output signals so that they may be summed, and further wherein said selectable delay causes the multiple output signals to thereby provide an enhanced depth of field in the vicinity of the borehole wall illuminated by the transmitted acoustic pulse.

14. The method of claim 13 wherein said selectable delays are implemented by employing multiple delay lines each of which has variable timed outputs with respect to the inputs thereto.

15. The method of claim 13 wherein said plural transmitter pulses are timed with regard to one another for transmission so that the received signals collectively provide an enhanced depth of field in focus.

16. The method of claim 13 wherein the transducer has a thickness T and said concentric circumferential regions are defined by a set of grooves concentrically arranged on a ceramic disc and extending partially through its thickness T.

17. The apparatus of claim 4 wherein said acoustic transceiver transducer is mounted on a structure cast thereabout and having a face spaced from said acoustic transducer by a multiple of a quarter of a wavelength of the principal operating frequency of the device.

* * * * *